United States Patent [19]

Jönsson

[11] Patent Number: 5,472,610
[45] Date of Patent: Dec. 5, 1995

[54] BLOWING A GAS INTO A GRANULAR FILTER BED

[75] Inventor: Kurt Jönsson, Nynäshamn, Sweden

[73] Assignee: Nordic Water Products AB, Nynashamn, Sweden

[21] Appl. No.: 137,039
[22] PCT Filed: Apr. 13, 1992
[86] PCT No.: PCT/SE92/00239
 § 371 Date: Oct. 18, 1993
 § 102(e) Date: Oct. 18, 1993
[87] PCT Pub. No.: WO92/18234
 PCT Pub. Date: Oct. 29, 1992

[30] Foreign Application Priority Data

Apr. 16, 1991 [SE] Sweden .................................. 9101142

[51] Int. Cl.⁶ .................................. C02F 3/20; C02F 3/30; B01J 8/02; B01D 39/06
[52] U.S. Cl. .................. 210/617; 210/794; 210/150; 210/220; 210/274
[58] Field of Search .................. 210/616–617, 210/150, 151, 220, 797, 794, 274, 618

[56] References Cited

U.S. PATENT DOCUMENTS

4,683,062  7/1987  Krovak et al. .................. 210/617

FOREIGN PATENT DOCUMENTS

61-50695    3/1986  Japan .................. 210/617
WO92/17409  10/1992 WIPO .................. 210/617

Primary Examiner—Thomas Wyse
Attorney, Agent, or Firm—Jacobson, Price, Holman & Stern

[57] ABSTRACT

A gas is blown into a filter (1) having a granular filter bed such that the gas flows into the bed along at least one elongate free edge disposed in the bed.

12 Claims, 1 Drawing Sheet

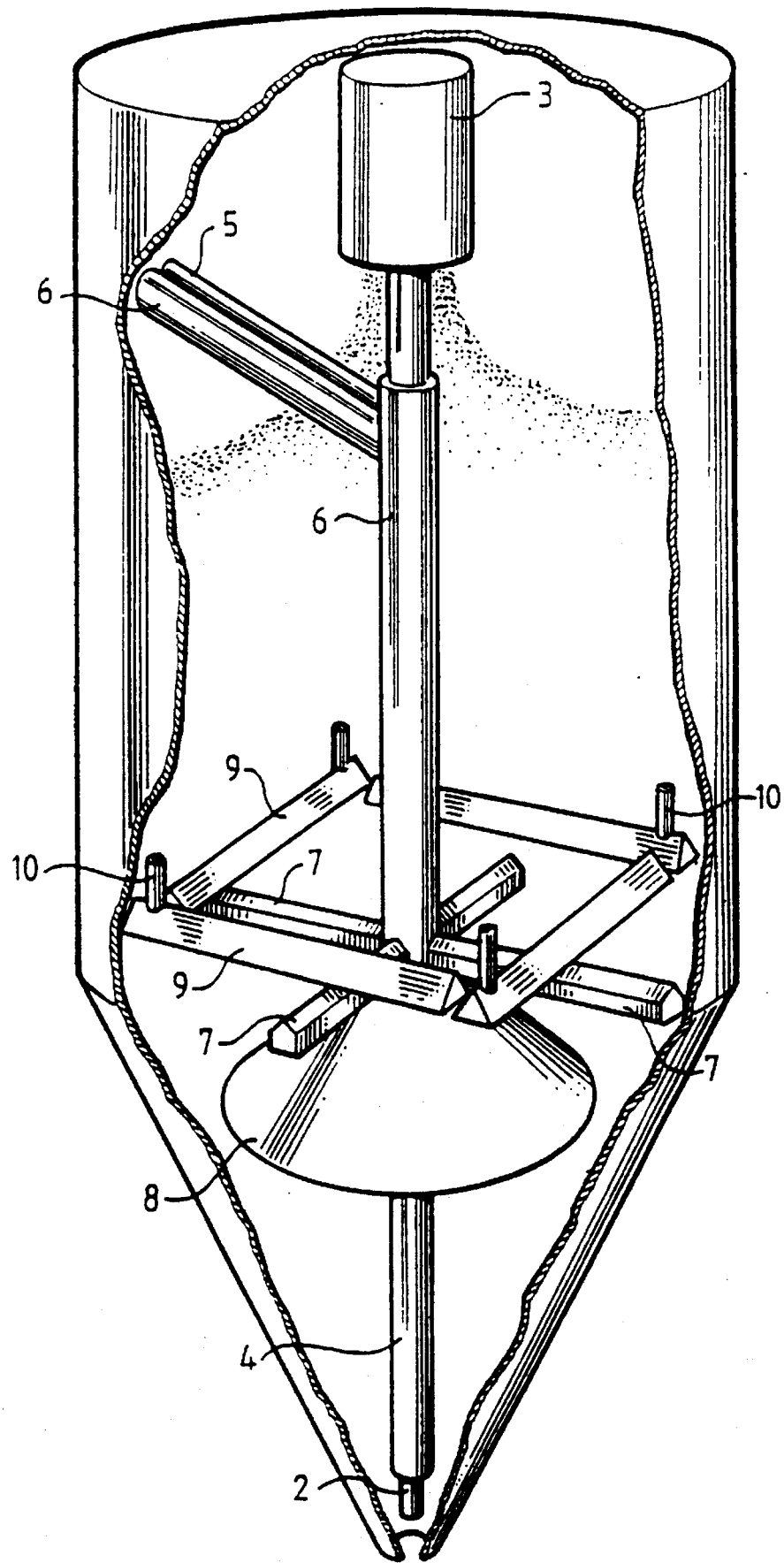

BLOWING A GAS INTO A GRANULAR FILTER BED

The present invention relates to a method and apparatus for blowing a gas into a granular filter bed of a type where the filter medium moves downwards against the flow of a suspension that is to be treated in the filter bed. The invention is particularly suitable for blowing air into a filter bed intended for the nitrification of wastewater.

In recent times there has been an increased need of nitrogen reduction in wastewater, not in the least due to governmental edicts. In Sweden, a nitrogen reduction of at least 50% will be demanded in 1992 for certain sensitive parts of its coastline, and the prerequisites for a 75% reduction are to be investigated. Nitrogen reduction is usually biologic, and in two steps. In the first step, ammonium compounds are oxidized to nitrates, i.e. nitrification, and in the second step nitrates are reduced to nitrogen gas, i.e. denitrification. The processes are usually carried out under agitation in sludge basins.

Greater interest has been shown in recent times for biological reduction using granular filter beds, for nitrification as well as denitrification. Great advantages may be obtained by biological purification in filter beds, as compared with the basin processes, there being, inter alia, no need for a number of sedimentation basins for separating and recirculating sludge. However, there are difficulties in the use of filter beds for nitrogen reduction, and one such difficulty will be dealt with below.

The first nitrogen reduction step, i.e. nitrification, takes place according to the general formula:

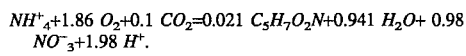

$$NH^+_4 + 1.86\ O_2 + 0.1\ CO_2 = 0.021\ C_5H_7O_2N + 0.941\ H_2O + 0.98\ NO^-_3 + 1.98\ H^+.$$

The ammonium compounds are reduced by oxygen to nitrates. The term 0.021 $C_5H_7O_2N$ corresponds to the production of new bacteria. The filter bed used may be a continuously operating sand filter, where the sand at the bottom of the bed is removed for washing and returned to the top of the bed. The wastewater that is to be treated is supplied at the bottom of the bed, and the treated water, i.e. the clear solution, is taken off from the top, or above the bed. Air is used as a source of oxygen, and is supplied at the bottom region of the bed via a number of horizontally disposed pipes having a large number of holes with a diameter of less than 1 mm. A sand filter operating continuously in this way is described, e.g. in the French patent specification No. 2 623 794.

The bacteria attach themselves to the grains of sand. If washing the sand is not performed too intensively, a bacterius strain remains after washing sufficiently for the nitrification. The strain grows in size as the sand in the filter bed moves downwards. Bacteria, which in such a case can form long threads, also attach themselves to the air inletpipes, causing the small air holes to become blocked. This causes the air supply to be cut off locally, or to decrease in magnitude. Another common cause of blocking up these holes is the deposition of lime. The difficulties caused by blockage of the air supply holes have been found impossible to overcome, except by dismantling the pipes after they have been in service for some time in order to clean them, which is expensive and troublesome.

The present invention relates to a new method and new apparatus for supplying gas into a granular filter bed of the kind mentioned in the introduction. In accordance with the invention, the gas is conveyed out into the filter bed by being continuously distributed along at least one elongated edge, flows round this edge and upwards within the filter bed, whereby the inflow being such that a substantially uniform distribution of the gas through the filter bed is created.

With the inflow of the gas in accordance with the invention, the ability of the bacteria to block the gas supply is simply and effectively inhibited. In addition, it is essential for obtaining effective utilisation of the invention that substantially uniform distribution of the gas blown into the bed is obtained, e.g. for nitrification there is desired as uniform as possible oxygenation of the bed.

It is to be emphasised that the invention is only applicable to a continuously operating filter bed, where the filtering medium adjacent to, and immediately below the inflow edge is continuously renewed and is not afforded the opportunity of filling up the space behind the edge.

In a preferred embodiment of the invention, the mentioned elongate edge is formed as a hood, open downwards and otherwise closed, excepting the place for gas supply to it. In this embodiment the hood has a shape similar to a ridged roof with end walls.

In order to achieve the above-mentioned uniform distribution of the incoming gas, a preferred embodiment utilises a constructively simple implementation with the mentioned elongate edge disposed substantially horizontal in the filter bed, thus ensuring uniform distribution of the gas flowing into the filter bed along the edge. The invention may be further improved by providing means for regulating the setting of the edge during operation.

It is also important that the gas is supplied to the hood at a low rate of flow, otherwise local over-pressure can occur in it, which would cause uneven gas flow to the filter bed. Flow barriers, e.g. baffles that smooth out the gas flows under the hood, can be arranged for further reducing the risk of local over-pressure. It has been found that the dynamic pressure of the gas at all points under the hood should be below 5 mm water column to obtain uniform gas flow to the filter bed. The dynamic air pressure under the hood should preferably be less than 2 mm water column.

An embodiment of the invention will now be described in more detail, and with reference to the accompanying drawing, which schematically illustrates a filter apparatus incorporating the described embodiment.

In the drawing there is illustrated a continuously operating filter bed 1, which is intended to be used for nitrification. The bed is assumed to be activated by autotrophic bacteria. A pipe 2, for conveying polluted filter medium, in this case sand, passes through the central portions of the bed, from its lowest level to a washing apparatus 3. Air is used for transporting the sand to the washing apparatus 3, whereby the air is taken down centrally in a pipe 4 disposed concentrically around the pipe 2 and provided with an inlet 5. The washed sand is returned to the top of the filter bed, and moves downwards in the bed as the sand at the bottom is taken away for washing. The wastewater that is to be treated in the bed is taken via a pipe 6 down into the bottom portion of the bed, e.g. under a plurality of horizontal arms 7 departing from the pipe 6. A cone 8 guides the downward movement of the sand for achieving its uniform cross-sectional distribution. The treated liquid, containing nitrates dissolved in the water, is taken out (not shown) somewhere above the bed. The wastewater is oxygenated during this counterflow process between water and sand. Oxygenation suitably takes place using air that is introduced into the filter bed under a plurality of elongate hoods 9 disposed horizontally in the bed just above the wastewater inlet. The hoods have a shape similar to that of a ridged roof, round the bottom edge of which the air flows into the bed. Each of the hoods is provided at one end with a pipe 10, through which air is supplied. It shall be possible to regulate the amount of air to each hood, which is why each one has its own air supply pipe, and is also provided with a regulating valve (not shown). In addition, there is preferably some means, operable exterior to the bed, for setting the inflow edge of the hoods as horizontal as possible, e.g. a rod with a threaded connection to its respective hood.

The amount of air required for acceptable nitrification in a sand bed would appear to be double as much volumetrically as the amount of wastewater. A surface load of the bed of 10 m/h wastewater requires about 20 m/h air loading. The bubbles ascend substantially vertically through the sand bed after they have left the hood edge. The number and size of the hoods should be dimensioned so that high air flow rates are avoided, since these might cause fluidisation inside the bed.

The stream of air bubbles ascending straight up from a hood edge pushes to one side some of the water in the bed. When the stream ceases, the empty space thus formed is filled by the water that flows back again, and this lateral movement of the water may be amplified by continually turning the air flow on and off, thus creating better oxygenation conditions for the water.

A preferred disposition of hoods has been described above. However, a plurality of different ways of disposing the hoods is possible for obtaining the inflow edge essential to the invention. For example, the hoods may extend in a circular configuration in the bed, and be subdivided into a plurality of sections, each having its own air supply. The hood edges may also be toothed instead of being smooth, as described above.

The filter has been described up to now as continuously operating. This does not mean that each operational phase is continuous. For example, the upward conveyance of polluted filtering medium (in this case sand) can be arranged to be stopped while building up a bacterium strain in the bed.

It should also be noted that although blowing air into a filter bed intended for the nitrification of wastewater has been specially described here, there are other fields of use as well, where blowing gas into a granular filter bed could come into question, and where the present invention could be used. With respect to the hoods, these do not need to be formed with a straight outflow edge, as illustrated on the drawing, but may have some other shape, e.g. circular for a hood in the form of a cone.

I claim:

1. A method of blowing gas into a granular filter bed of a continuously operating filtering apparatus which comprises providing at a bottom end of the filter bed an enclosure having an open bottom and an elongate bottom edge and directing the gas outwardly from said enclosure over the length of said edge and upwardly through the bed.

2. A method as claimed in claim 1 wherein said enclosure comprises a downwardly open elongate hood with a closed top and said edge comprises a lower horizontal edge of the hood, further wherein said gas is introduced into the hood for flow over said edge and upwardly through the bed.

3. A method as claimed in claim 1 wherein the gas is blown intermittently into the filter bed.

4. A method as claimed in claim 1 wherein the gas has a dynamic pressure of less than 5 mm water column prior to flow through the filter bed.

5. A method as claimed in claim 4 wherein said dynamic pressure is 2 mm water column 6. Apparatus for blowing a gas into a granular filter bed of a continuously operating filter apparatus comprising an elongate hood arranged in a bottom end of the filter bed, the hood being closed upwardly and open downwardly, such as to form an elongate lower inflow edge for the gas, said edge being disposed substantially horizontally in the filter bed during operation of the filter apparatus and means for introducing gas into said hood for flow over said edge and upwardly through the filter bed.

7. Apparatus as claimed in claim 6, wherein said inflow edge is straight.

8. Apparatus as claimed in claim 6, wherein the hood is V-shaped in cross section.

9. Apparatus as claimed in claim 6, wherein the inflow edge is circular.

10. Apparatus as claimed in claim 1, including means for setting the position of the hood edge.

11. Apparatus as claimed in claim 1, including a valve in a gas supply line, for supplying the gas intermittently to the hood.

12. Apparatus as claimed in claim 1, including flow obstructing means for dampening the gas flows under the hood.

* * * * *